(12) United States Patent
McDonagh et al.

(10) Patent No.: US 8,913,644 B2
(45) Date of Patent: *Dec. 16, 2014

(54) ENHANCED OPTICAL PUMPING OF MATERIALS EXHIBITING POLARIZATION-DEPENDENT ABSORPTION

(71) Applicant: Coherent Kaiserslautern GmbH, Kaiserslautern (DE)

(72) Inventors: Louis McDonagh, Kaiserslautern (DE); Achim Nebel, Stelzenberg (DE); Ralf Knappe, Trippstadt (DE)

(73) Assignee: Coherent Kaiserslautern GmbH, Kaiserslautern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,264

(22) Filed: Aug. 14, 2013

(65) Prior Publication Data

US 2013/0329762 A1 Dec. 12, 2013

Related U.S. Application Data

(63) Continuation of application No. 10/857,642, filed on May 28, 2004, now Pat. No. 8,542,713.

(30) Foreign Application Priority Data

May 30, 2003 (EP) .................................... 03012451

(51) Int. Cl.
*H01S 3/094* (2006.01)
*H01S 3/0941* (2006.01)
*H01S 3/16* (2006.01)

(52) U.S. Cl.
CPC .......... *H01S 3/09415* (2013.01); *H01S 3/1673* (2013.01); *H01S 3/1611* (2013.01)
USPC .......................................................... 372/71

(58) Field of Classification Search
CPC .......... H01S 3/094038; H01S 3/09453; H01S 3/1611; H01S 3/1673
USPC .......................................................... 372/71
See application file for complete search history.

(56) References Cited

U.S. PATENT DOCUMENTS 5,742,632 A 4/1998 Barnes et al.
5,999,544 A 12/1999 Petersen
(Continued)

FOREIGN PATENT DOCUMENTS

EP 0742965 A1 11/1996
EP 0742965 B1 4/1998
(Continued)

OTHER PUBLICATIONS

Final Office Action received for U.S. Appl. No. 10/857,642 mailed on Oct. 25, 2006, 7 pages.

(Continued)

*Primary Examiner* — Tod T Van Roy
*Assistant Examiner* — Marcia Golub-Miller
(74) *Attorney, Agent, or Firm* — Morrison & Foerster LLP

(57) ABSTRACT

An optically pumped laser oscillator or amplifier includes a laser head having a gain medium exhibiting polarization-dependent absorption along two crystallographic axes and a pump source producing a pump beam. The medium's absorption coefficients along both said crystallographic axes are equal or the difference between the absorption coefficients relative to the lowest absorption coefficients $R=\text{Abs}(\alpha_c-\alpha_a)/(\min(\alpha_c, \alpha_a))$ is reduced at least by a factor of two compared to the same relative difference between the two absorption coefficients at the medium's absorption peaks, used for conventional pumping by pumping with unpolarized or partially polarized pump light at a wavelength around which the average absorption coefficients along both of said crystallographic axes are equal or present a relative difference that is reduced by a factor of two or better compared to conventional pumping around the medium's absorption peaks.

5 Claims, 4 Drawing Sheets

(56) References Cited

U.S. PATENT DOCUMENTS

| | | | |
|---|---|---|---|
| 6,047,014 | A | 4/2000 | Hyuga et al. |
| 6,137,820 | A | 10/2000 | Maag et al. |
| 6,144,484 | A | 11/2000 | Marshall |
| 6,185,235 | B1 | 2/2001 | Cheng et al. |
| 6,347,101 | B1 | 2/2002 | Wu et al. |
| 6,366,596 | B1 | 4/2002 | Yin et al. |
| 8,542,713 | B2 * | 9/2013 | Nebel et al. ............ 372/71 |
| 2003/0206695 | A1 | 11/2003 | Gerber et al. |
| 2004/0101015 | A1 | 5/2004 | Butterworth |
| 2005/0036531 | A1 * | 2/2005 | Kan et al. .............. 372/70 |
| 2005/0053104 | A1 | 3/2005 | Kulp et al. |
| 2005/0063441 | A1 * | 3/2005 | Brown ................. 372/50 |
| 2005/0152426 | A1 | 7/2005 | Dell'Acqua et al. |
| 2008/0013586 | A1 * | 1/2008 | Spence et al. ........... 372/70 |

FOREIGN PATENT DOCUMENTS

| | | | |
|---|---|---|---|
| JP | 2000-307179 | A | 11/2000 |
| WO | 2004/049523 | A2 | 6/2004 |
| WO | 2004/049523 | A3 | 10/2004 |
| WO | 2004/049523 | B1 | 11/2004 |

OTHER PUBLICATIONS

Final Office Action received for U.S. Appl. No. 10/857,642 mailed on Jan. 8, 2008, 5 pages.
Final Office Action received for U.S. Appl. No. 10/857,642 mailed on Jul. 8, 2008, 7 pages.
Final Office Action received for U.S. Appl. No. 10/857,642 mailed on Mar. 11, 2009, 6 pages.
Non Final Office Action received for U.S. Appl. No. 10/857,642 mailed on Mar. 9, 2006, 9 pages.
Non Final Office Action received for U.S. Appl. No. 10/857,642, mailed on Jul. 27, 2007, 4 pages.
Non Final Office Action received for U.S. Appl. No. 10/857,642, mailed on Aug. 28, 2009, 5 pages.
Notice of Allowance received for U.S. Appl. No. 10/857,642, mailed on Jun. 3, 2013, 9 pages.
Boucher et al., "Multiwatt CW Diode End-Pumped Nd:YAP Laser at 1.08 and 1.34 μm: Influence of Nd Doping Level", Optics Communications, Oct. 15, 2002, pp. 139-148.
Dudley et al., "Direct 880 nm Diode-Pumping of Vanadate Lasers", In Proceeding of Lasers and Electro-Optics, 2002, 1 page.
Lavi et al., "Efficient Pumping Scheme for Neodymium-Doped Materials by Direct Excitation of the Upper Lasing Level", Applied Optics, vol. 38, No. 36, Dec. 20, 1999, pp. 7382-7385.

\* cited by examiner

ENHANCED OPTICAL PUMPING OF MATERIALS EXHIBITING POLARIZATION-DEPENDENT ABSORPTION

PRIORITY

This application is a continuation of U.S. patent application Ser. No. 10/857,642, filed May 28, 2004, which claims priority to European Patent Application No. 03012451.5, filed May 30, 2003, which issued as European Patent No. 1482607 on Apr. 12, 2006, the disclosures of which are herein incorporated by reference in their entirety.

FIELD OF THE INVENTION

The present invention relates to the field of lasers, and in particular to solid-state laser oscillators or amplifiers using gain media exhibiting different absorption coefficients, depending on the polarization and the wavelength of the incident pump light.

BACKGROUND OF THE INVENTION

As lasers are finding more and more applications in research, medicine, industry and other various fields, new or improved laser sources are constantly needed. A common goal is to design higher power sources, while maintaining or improving other characteristics, especially beam quality. A way of achieving such laser sources is by optical pumping of a solid-state material with laser diodes. These offer a much narrower emission spectrum than previously used flash lamps, not mentioning higher efficiency and longer lifetimes among many advantages. This results in optimized absorption of the pump light at a wavelength close to the medium's absorption peak, often allowing the pump light to be absorbed in a single pass through the laser medium. However, many of these materials exhibit different absorption coefficients depending on the pump light's polarization. Such materials include $Nd:YVO_4$, $Nd:GdVO_4$, Nd:YLF, $Nd:YAlO_3$, Nd:LSB and Nd:YAP. One common combination is a Neodymium-doped Vanadate crystal pumped by laser diodes emitting at Neodymium's absorption peaks, around 808 nm or even 880 nm. The latter may be preferred to the first for reducing the quantum defect, effectively limiting the crystal's thermal load. Therefore lower crystal temperature and reduced bulging of end surfaces are achieved, leading to lower and less aberrated thermal lensing. Conversely, higher pump power may be applied to the crystal with regard to 808 nm pumping. Such direct pumping of the upper laser level of Vanadate, along with experimental comparison with 808 nm pumping, is described in Dudley et al., "Direct 880 nm Diode-pumping of Vanadate Lasers", CLEO 2002.

Then, the crystal's doping concentration in active ions is selected to achieve the desired absorption length. In many cases, a short absorption length is desired to localize the gain region to a small volume, in order to optimize pump/laser mode matching. However, scaling such pumping schemes to higher power requires increasing the pump light's absorption length in order to spread the heat load in a larger volume. A common way of achieving this is to lower the crystal's doping concentration, keeping the diodes emitting at the same wavelength. Choosing the right doping allows to tailor the absorption to specific needs or setups. This technique and various embodiments are described in Cheng et al., "Lasers with low doped gain medium", U.S. Pat. No. 6,185,235.

Using very long crystals requires spreading the absorption on its whole length, therefore reducing the doping to a very low value. However the available crystal growing technology cannot achieve very low doping while maintaining acceptable accuracy on the concentration in active ions. For example, Neodymium Vanadate crystals' availability is currently limited to about 0.1% atm. Nd doping, +/−50% relative accuracy. The use of such crystals is therefore prohibited when repeatable performance and characteristics are desired, without individually selecting each crystal. One is therefore limited in the choice of pumping schemes and crystals, so that the desired absorption length can be achieved with low-doped materials readily available. Thus, in order to use long media and spread the absorption along its length, a solution is needed to achieve very low absorption in materials of available doping concentration.

Another limit to optimized pump absorption arises from the polarization dependence of absorption in certain laser materials, as previously mentioned. Neodymium Vanadate ($Nd:YVO_4$) will be used to illustrate the different concepts and physical effects, as it is at present a very attractive and widely used laser material, exhibiting a strong polarization dependence of absorption. It should be noted that this specific laser crystal is solely stated for illustration purposes, and does not restrict in any way the scope of the invention.

$Nd:YVO_4$ exhibits a great difference in absorptions on its a and c axes around its absorption peaks and usual pump wavelengths of 808 and 880 nm ($\alpha_c=3.7\alpha_a$ at 808 nm, and $\alpha_c=3\alpha_a$ at 880 nm). Many high power end-pumped schemes make use of fiber coupling or other devices to deliver the pump light from the diodes to the crystal. Most of these delivery systems do not maintain the original linear polarization of the diode's emission, leading to unpolarized or partially polarized output. Therefore the absorption length of this pump light will depend on how it's split between the two polarizations along the crystal's a and c axes. Furthermore, the proportion of pump light polarized on each axis can depend on environmental factors—rotation or twisting of the fiber—that cannot be easily controlled. The pump absorption length will then depend on these factors, leading to variable laser output characteristics. One way of circumventing that problem is to depolarize the pump light before or after the pump delivery system, leading to unpolarized light. Petersen, U.S. Pat. No. 5,999,544 describes such a system used in conjunction with fiber-coupled diode bars. Although the use of such depolarizer guaranties insensitivity to environmental influences at the cost of minimum added complexity, the absorption curve and length will be identical to that of unpolarized light.

One should notice however that the absorption of unpolarized light by a medium exhibiting different absorption coefficients along two or more of its axes doesn't allow the same optimization and ultimate performance as with polarized light. In the case of Vanadate, most of the pump light polarized along the crystal's c-axis is absorbed within a short distance from the entrance face, whereas it takes a much longer distance for the light polarized on the a-axis to be absorbed. Then, for the same total absorbed power, polarized pumping provides lower absorbed pump power density close to the entrance face, spreading the absorption on the whole length of the crystal. On the contrary, unpolarized pumping creates a higher thermal load close to the entrance face, leading to bulging of the crystal's surface, higher temperature, and effectively higher thermal lensing and aberrations.

One solution to reducing the effects of such strong absorption close to the entrance surface of the pump light is described in Marshall, U.S. Pat. No. 6,144,484. Undoped end-caps are diffusion bonded to the crystal's ends to act as a thermal reservoir, thus reducing the pump induced bulging of the crystal and keeping the crystal's pumped volume at a lower temperature than with freestanding ends. This results in reduced and less aberrated thermal lensing, ultimately increasing the maximum applicable pump power while maintaining beam quality. However this is just an improvement to classic end-pumping, allowing slightly higher power to be applied to the crystal, but not reducing the high local thermal load itself. Furthermore the cost and the limited availability of such crystals with diffusion-bonded end-caps limits their use in a product. Is it therefore desirable to use polarized rather than unpolarized light to optimize the pumping scheme and finally the laser's overall performance.

However, many end-pumped systems make use of optical fibers, fiber bundles or other homogenizing devices for pump light delivery, providing spatially homogenized light distribution to the crystal, but without the conservation of the diode's linear polarization. One technique for maintaining this polarization or achieving low depolarization is to use very short single fibers, maintained straight in a fixed position. Although this technique provides close to linearly polarized light, spatial homogenization isn't as good as with longer fibers. There is therefore a tradeoff between beam quality and polarization conservation. Furthermore, the use of such polarization-maintaining technique cannot always be implemented or is too impractical for certain configurations, not allowing separation of the pump source from the laser cavity.

Another technique for delivering polarized light to the laser medium, even after partial or total depolarization of the pump light through a delivery or homogenizing device, is presented in Maag et al., U.S. Pat. No. 6,137,820. The partially or totally unpolarized pump beam is split by a polarizing element in two beams of orthogonal linear polarizations. One of the two beams passes through a polarization-rotating element (e.g. a half-wave plate oriented at 45° of the incident polarization) that rotates the polarization by an angle of 90°, making the second beam linearly polarized parallel to the first. Then these two beams pump the laser crystal either independently from both sides, or superimposed on one face of the crystal. The crystal is therefore pumped on one single polarization, either on the strong or the weak absorption axis, depending on the desired configuration. Although such system provides linearly polarized pump light, it is split in two beams that need to both overlap with the laser mode in the crystal. Thus, the choice of pumping configurations is limited by this requirement. Furthermore, additional components are needed (polarizer, wave-plate, lenses, etc. . . . ), which increase the complexity of the system, thus forbidding its use in most applications and products.

Therefore there is a need for a technique that allows pumping a material exhibiting polarization-dependent absorption with unpolarized or partially polarized light, while keeping the benefits of pumping with linearly polarized light.

There is a further need for a technique that allows to increase the absorption length beyond what is achievable with low-doped crystals and regular laser diodes emitting around the absorption peaks, effectively allowing higher pump power to be applied compared to low-doped crystals pumped at the peak wavelengths.

SUMMARY OF THE INVENTION

Accordingly, an object of the invention is to provide a method of pumping laser materials known as having polarization-dependent absorption, with a certain pump source for which the absorption on both polarizations is equal or presents a reduced difference compared to pumping at the material's common absorption peak(s).

Another object of the invention is to provide a method of pumping laser materials known as having polarization-dependent absorption, with partially polarized or totally unpolarized light, while keeping the absorption coefficients on both polarizations equal or reducing their difference compared to pumping at the material's common absorption peak(s).

A further object of the invention is to provide a method for achieving a low and polarization-independent absorption in $Nd:YVO_4$, unachievable at the common peak absorption wavelengths around 808 and 880 nm.

These and other objects of the invention are achieved in a laser oscillator or amplifier apparatus containing a gain medium which exhibits polarization-dependent absorption.

According to the invention an optically pumped laser oscillator or amplifier is provided, comprising: a laser head including a gain medium exhibiting polarization—dependent absorption along two crystallographic axes and a pump source producing a pump beam, wherein the medium's absorption coefficients along both said crystallographic axes are equal or the difference between the absorption coefficients relative to the lowest absorption coefficient $R=Abs(\alpha_c-\alpha_a)/(min(\alpha_c,\alpha_a))$ is reduced at least by a factor of two compared to the same relative difference between the two absorption coefficients at the medium's absorption peaks, used for conventional pumping either by pumping with unpolarized or partially polarized pump light at a wavelength around which the average absorption coefficients along both of said crystallographic axes are equal or present a relative difference that is reduced by a factor of two or better compared to conventional pumping around the medium's absorption peaks or by pumping with a combination of two pump sources emitting light at different wavelengths and of orthogonal polarizations, each of the pump sources emitting at a wavelength for which the absorption coefficients on their respective crystallographic axes are equal or present a relative difference that is reduced by a factor of two or better compared to conventional pumping around the medium's absorption peaks.

The invention provides also a method of pumping laser materials having polarization-dependent absorption along two crystallographic axes with a pump beam wherein the medium's absorption coefficients along both said crystallographic axes are equal or the difference between the absorption coefficients relative to the lowest absorption coefficient $R=Abs(\alpha_c-\alpha_a)/(min(\alpha_c,\alpha_a))$ is reduced at least by a factor of two compared to the same relative difference between the two absorption coefficients at the medium's absorption peaks, used for conventional pumping either by pumping with unpolarized or partially polarized pump light at a wavelength around which the average absorption coefficients along both of said crystallographic axes are equal or present a relative difference that is reduced by a factor of two or better compared to conventional pumping around the medium's absorption peaks or by pumping with a combination of two pump sources emitting light at different wavelengths and of orthogonal polarizations, each of the pump sources emitting at a wavelength for which the absorption coefficients on their respective crystallographic axes are equal or present a relative difference that is reduced by a factor of two or better compared to conventional pumping around the medium's absorption peaks.

DETAILED DESCRIPTION

Figure 1:
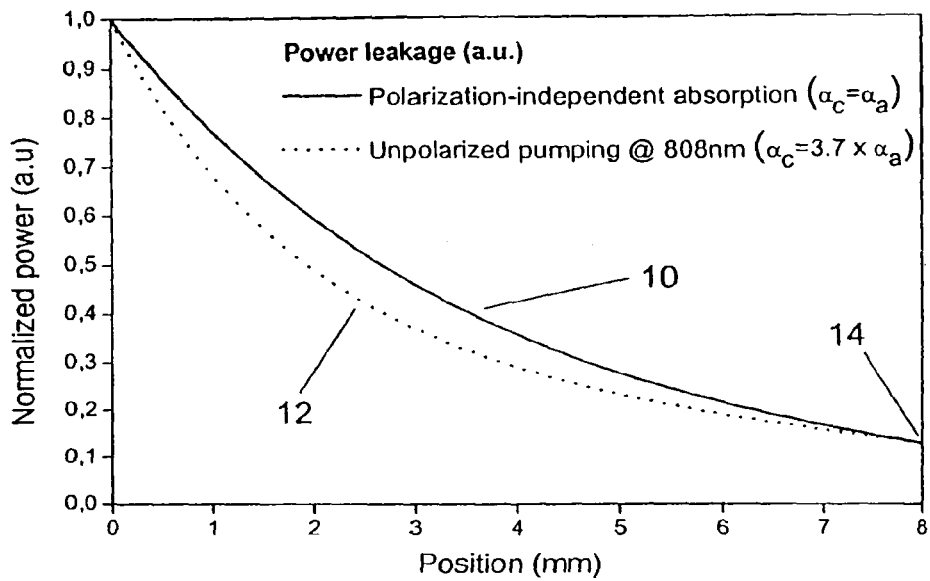
FIG. 1 is a graph illustrating the non-absorbed power in $Nd:YVO_4$, for absorption around 808 nm with unpolarized pumping and for polarization-independent absorption at specific wavelengths (around 819 and 888 nm).

Diode pumping of laser crystals generally utilizes laser diodes emitting around their absorption peak(s). For example, Nd:YVO$_4$ is usually pumped around its absorption peaks around 808 nm (strongest) or 880 nm (weaker) to maximize absorption. At the most common pump wavelength of 808 nm, the absorption coefficient $\alpha_c$ on the crystal's c-axis is 3.7 times larger than $\alpha_a$ on the a-axis. Therefore, when pumping a Vanadate crystal at such a wavelength with unpolarized or partially polarized light, all the pump light polarized along the c-axis is absorbed within a few millimeters, whereas it takes a much longer length for the light polarized on the a-axis to be absorbed. FIG. 1 illustrates the remaining non-absorbed pump power along the crystal's length for classic unpolarized pumping at 808 nm (12) and for polarized pumping or otherwise unpolarized pumping when the absorptions on the a and c-axis are equal (10). In the case of polarization-insensitive pumping, the decrease in pump power along the length (1) of the crystal is exponential ($\exp(-\alpha 1)$), where $\alpha$ is the absorption coefficient. However, in the case of unpolarized pumping at 808 nm, the decrease in pump power along the length of the crystal is not exponential: it is the sum of a rapidly decreasing exponential on the c-axis ($\exp(-\alpha_c 1)$) and a slower decreasing exponential on the a-axis ($\exp(-\alpha_a 1)$). Therefore, in the case of totally unpolarized light (same power on both polarizations), the decrease in pump power along the crystal's length is described by $0.5(\exp(-\alpha_c 1)+\exp(-\alpha_a 1))$.

Figure 2:
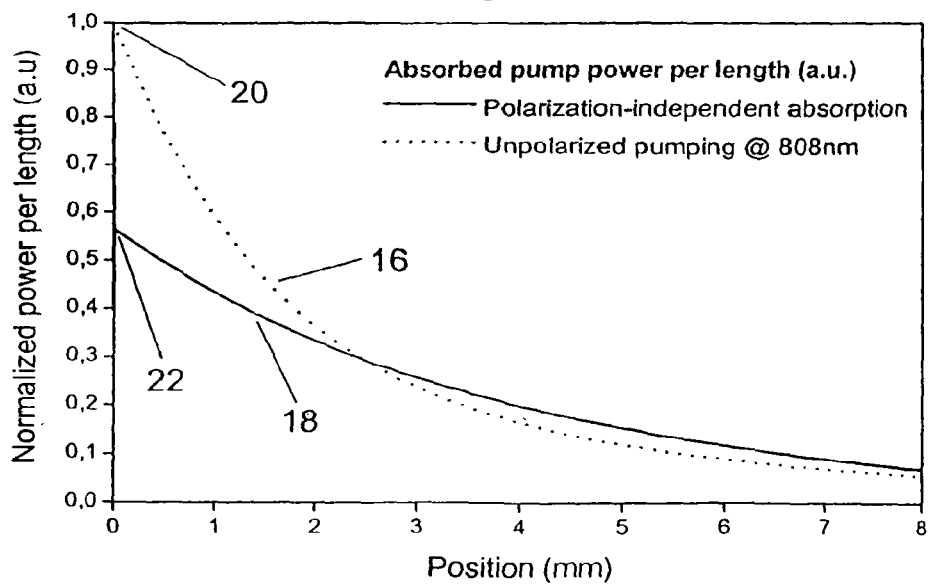
FIG. 2 is a graph illustrating the absorbed power per length in Nd:YVO$_4$, for absorption around 808 nm with unpolarized pumping and for polarization-independent absorption at specific wavelengths (around 819 and 888 nm).

The absorption coefficients for the two pumping methods are adjusted in order to achieve the same total absorbed power, or in other words the same pump power leakage after passing through the crystal. Therefore the non-absorbed power for pumping with polarization-independent absorption (10) and with unpolarized pumping at 808 nm (12) is the same at the output facet of the crystal (14). FIG. 2 shows the absorbed pump power per length for both pumping methods. As the absorbed power per length is given by the first derivative of the local pump power density, it is described by an exponential decay ($\alpha \cdot \exp(-\alpha 1)$) for polarization-insensitive pumping (18) and by the sum of two exponentials for unpolarized pump light ($0.5(\alpha_c \cdot \exp(-\alpha_c 1)+\alpha_a \cdot \exp(-\alpha_a 1))$) (16). The absorbed power per length is then plotted for the two pumping methods. This gives a representation of the local thermal load along the length of the crystal, which ultimately leads to a limit in the applicable pump power. The value of the normalized absorbed power per length at the entrance face of the crystal is 1 for unpolarized pumping (20) and 0.56 for polarization-insensitive pumping (22). One should notice that polarization-independent absorption ($\alpha=\alpha_a=\alpha_c$) reduces the absorbed pump power density by almost a factor of two close to the entrance face of the crystal in the case of Nd:YVO$_4$. This reduced local thermal load effectively leads to lower temperature in the pump spot and reduced bulging of the crystal's front face.

It should be noted that Vanadate was stated here solely for purpose of illustration because of the large ratio between its two absorption coefficients at the peak absorption wavelength. It does not limit in any way the scope of the invention. One should note that the larger the ratio between the two absorption coefficients, the bigger benefit polarization-insensitive pumping will provide. This can be understood in the case of unpolarized pumping as an even steeper decrease of pump power density close to the front face, and a slower decrease on the rest of the crystal's length.

Additionally, as many end pumping schemes involve fiber-coupled pump diodes providing unpolarized or partially polarized light, having equal absorption coefficients on both directions of polarization would allow the fiber to be turned around its axis or twisted without significant variations in the pump's absorption length.

Figure 3:
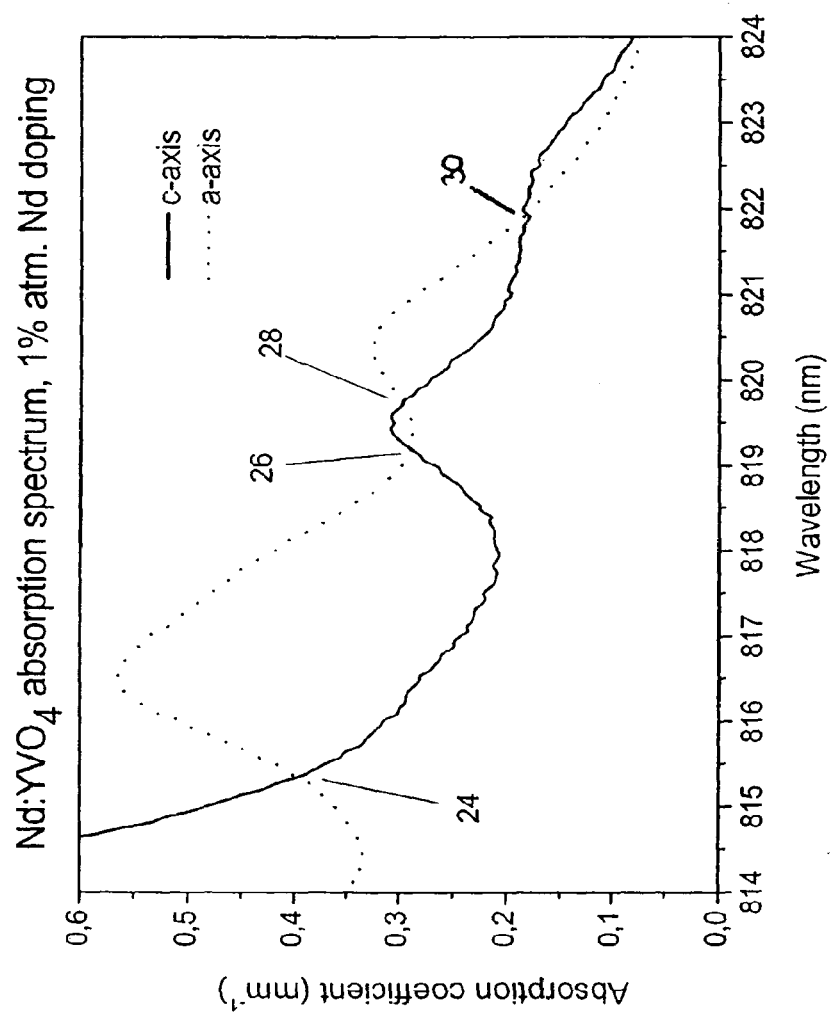
FIG. 3 is a plot of the absorption spectrum of Nd:YVO$_4$ around 819 nm.
Figure 4:
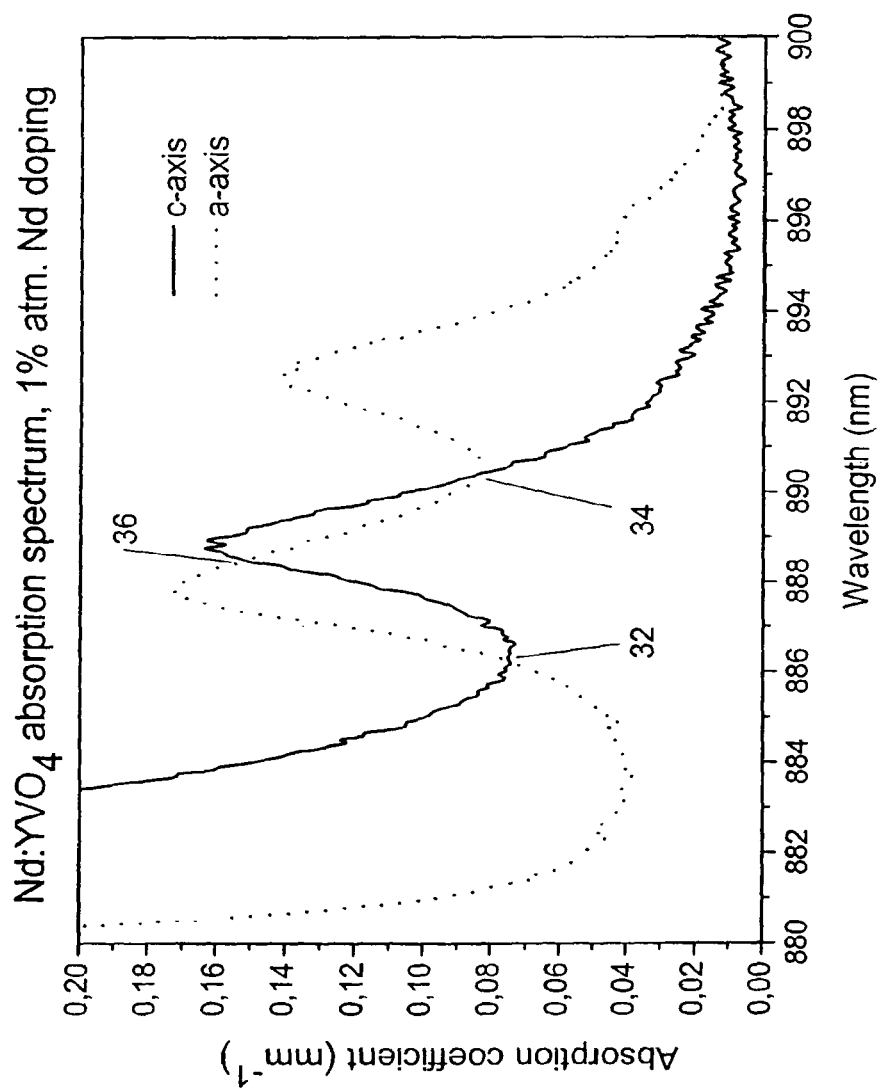
FIG. 4 is a plot of the absorption spectrum of Nd:YVO$_4$ around 888 nm.

Such polarization-insensitive absorption can be achieved in Vanadate at certain selected wavelengths, namely around 819 and 888 nm where the absorption coefficients are equal. FIG. 3 illustrates the absorption curves along the two crystallographic axes around 819 nm, whereas FIG. 4 provides the same information around 888 nm. At certain wavelengths the absorption coefficient curves for the a-axis and the c-axis are crossing and the absorption coefficients are equal (FIG. 3, (24), (26), (28) (30) and FIG. 4 (32), (34), (36)). Pumping at around 888 nm may be preferred for its reduced quantum defect and higher efficiency with respect to 808 and 819 nm pumping, as described for 880 nm pumping in Dudley et al., "Direct 880 nm Diode-pumping of Vanadate Lasers", CLEO 2002.

Utilizing pump diode(s) emitting in a narrow bandwidth will help keep emitted wavelengths close to the crossing of the two absorption coefficients, in a range where these two values are in the vicinity of each other. Furthermore, an increase of one absorption coefficient from the crossing point towards the lower wavelengths will be advantageously compensated by an increase of the other coefficient towards the longer wavelengths. This will ensure that even though the two coefficients are not precisely equal for all wavelengths comprised in the pump light, the global absorption coefficients for the full emission spectrum of the pump light will remain very close to each other. This can be illustrated at certain selected wavelengths (FIG. 3, (24) and FIG. 4 (36)). If the spectral bandwidth of the laser diode isn't narrow, one has to calculate the convolution of the emitted spectrum with the absorption spectrum for both polarizations to get the average absorption for the a-axis and the c-axis equal. Then one will find a wavelength for the maximum of the laser diodes spectrum around 819 nm (FIG. 3) and 888 nm (FIG. 4) where the average absorption coefficients are equal.

Power scaling of laser oscillator or amplifier concepts usually requires that the pump light absorption is reduced and therefore spread on a longer medium. This is usually achieved by lowering the material's doping concentration and pumping at a regular wavelength where an absorption peak is present. For example, Vanadate is generally pumped at its absorption peaks around 808 or 880 nm. However, crystals offering a doping concentration below 0.1% atm aren't readily available in a controlled fashion. This lowest value limits the minimum achievable absorption and in turn the maximum crystal length that can be effectively used. One way of circumventing this problem is to pump at other wavelengths where the absorption coefficient is much lower than at the absorption peaks. FIG. 3 and FIG. 4 illustrate the absorption spectrum of Nd:YVO$_4$ around 819 and 888 nm. These values may be compared to absorption coefficients at 808 nm: $\alpha_c$=3.7 mm$^{-1}$, $\alpha_a$=1.0 mm$^{-1}$ @ 808 nm, whereas $\alpha_c$=$\alpha_a$=0.25 mm$^{-1}$ @ 819 nm and $\alpha_c$=$\alpha_a$=0.15 mm$^{-1}$ @ 888 nm. Such low absorption coefficients allow spreading the absorption on much longer crystals than previously possible when pumping at 808 or 880 nm.

Therefore pumping of Neodymium-Vanadate around 819 or 888 nm provides both the low absorption necessary to some high power systems, and the polarization insensitivity, which allows to increase the applicable pump power and to use unpolarized or partially polarized pump light with all the benefits of polarization-insensitive absorption previously mentioned.

Another way of achieving the same absorption on both axis of a laser material exhibiting polarization-dependent absorption is to pump it with different wavelengths on each polarization. The wavelength $\lambda_1$ on the a-axis, respectively $\lambda_2$ on the c-axis may be tuned independently so that the absorption coefficients are equal on both axes ($\alpha_{a,\lambda 1}$=$\alpha_{c,\lambda 2}$). Such concept may be illustrated for Neodymium-Vanadate. The absorption spectrum presented in FIG. 4 shows that the absorption coefficients on the c-axis at $\lambda_2$=886.5 nm (32) and on the a-axis at $\lambda_1$=890.5 nm (34) are very close, both surrounded by similar symmetric increases when the wavelength is detuned. Therefore, the combination of two pump sources emitting around these two wavelengths on orthogonal polarizations will provide equal absorption on each of the laser medium's axes. This may be realized in practice by combining the linearly polarized output of two pump diodes, one having it's polarization being rotated 90°.

All the previous descriptions were made for ideal cases where the absorption is equal on the two polarizations along the medium's axes. This particular configuration was chosen to best illustrate the benefits of reducing the difference in absorption coefficients, as it provides the greatest improvements for reducing the thermal load close to the medium's front face. However any intermediate situation where the difference in absorption coefficients is reduced compared to that of conventional pumping around the medium's absorption peaks would provide comparable advantages. It should therefore be understood that the spirit of the invention isn't limited to the particular situation where absorption coefficients are exactly equal, but would rather be defined as a significant reduction of the difference between the absorption coefficients at the common pump wavelengths. The scope of the invention can therefore be defined as a 50% or better reduction of the relative difference between the absorption coefficients at the common pump wavelengths. In other words, if we define R=Abs($\alpha_c$-$\alpha_a$)/(min($\alpha_c$, $\alpha_a$)) as the difference between the absorption coefficients relative to the lowest absorption coefficient, then the scope of the invention includes the choice of any pumping scheme where the relative difference R between the two absorption coefficients is reduced by 50% or better compared to the same relative difference at the common pump wavelengths. Therefore one has to compare the relative difference between the absorption coefficients at the common pump wavelengths with the same difference for the chosen pumping scheme. Note that a relative difference R=0 represents the ideal case where $\alpha_c$=$\alpha_a$. If the relative difference between the two absorption coefficients for the chosen pumping scheme is reduced by 50% or better compared to pumping at the common wavelengths, the system would then benefit from all the advantages and improvements previously cited, even if reduced compared to the ideal case of perfectly equal absorption coefficients.

Although Neodymium Vanadate (Nd:YVO$_4$) was widely used throughout the description of the invention and the explanation of its various objects, it is not intended to limit the invention to this particular laser material. It was chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

Figure 5A:
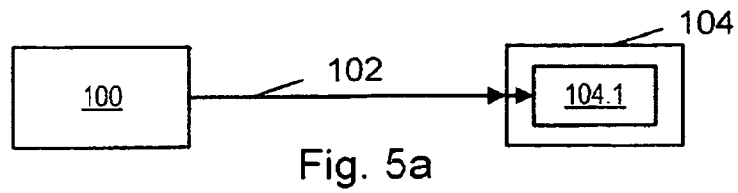
FIG. 5a shows a simple embodiment containing one single pump source emitting a pump beam which is guided to a laser head containing a gain medium.

FIG. 5a shows a simple embodiment containing one single pump source 100 emitting a pump beam 102 which is guided to a laser head 104 containing a gain medium 104.1.

Figure 5B:
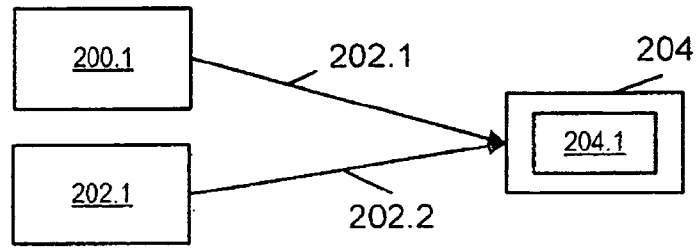
FIG. 5b shows two pump sources each emitting a pump beam, both pump beams being guided to a laser head containing a gain medium.

FIG. 5b shows two pump sources 200.1 and 200.2 emitting two pump beams 202.1 and 202.2, respectively, both pump beams 202.1 and 202.2 being guided to a laser head 204 containing a gain medium 204.1.

Figure 5C:
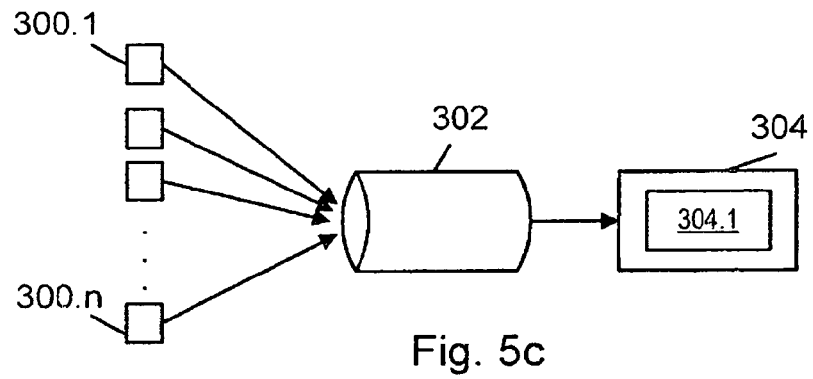
FIG. 5c shows an array of n diodes, each diode emitting one of a plurality of n pump beams, the n pump beams being guided to a non-polarization-maintaining device (which can be a fiber); from the non-polarization-maintaining device the pump beam is guided to a laser head containing a gain medium.

FIG. 5c shows an array of diodes 300.1 to 300.n emitting a plurality of n pump beams being guided to a non-polarization-maintaining device 302 (which can be a fiber). From the non-polarization-maintaining device 302 the pump beam is guided to a laser head 304 containing a gain medium 304.1.

Figure 5D:
FIG. 5d shows an array of n diodes, each of the n diodes emitting one of a plurality of n pump beams which are combined to one single pump beam by means of n polarizing elements.

FIG. 5d shows an array of diodes 400.1 to 400.n emitting a plurality of n pump beams which are combined to one single pump beam by means of polarizing elements 402.1 to 402.n.

Please note that FIGS. 5a, 5b, 5c and 5d are understood to be merely schematic and not to scale.

In some embodiments, the gain medium is a Neodymium-doped Vanadate (Nd:YVO$_4$) crystal and the pump center wavelength is at 888±4 nm. In some embodiments, the gain medium is a Neodymium-doped Vanadate (Nd:YVO$_4$) crystal longer than 15 mm.

The invention claimed is:

1. A method of exciting an elongated gain medium formed from a Neodymium-doped Vanadate (Nd:YVO$_4$) crystal comprising:
   directing pump light laser into an end of the gain medium, said pump light having a center wavelength of 888±4 nm.

2. The method of claim 1, wherein the pump light is emitted by laser diodes and delivered to a gain medium through a non-polarization-maintaining device.

3. The method of claim 2, wherein the non-polarization-maintaining device is an optical fiber.

4. The method of claim 1, wherein the pump light is emitted by laser diodes whose beams are combined by means of polarizing elements.

5. The method of claim 1, wherein the crystal gain medium is longer than 15 mm.

* * * * *